United States Patent
McIlvain

(10) Patent No.: US 6,693,525 B1
(45) Date of Patent: Feb. 17, 2004

(54) MOTOR VEHICLE BRAKE LIGHT SYSTEM

(76) Inventor: Sheila M. McIlvain, 6012 Woodacres Dr., Bethesda, MD (US) 20816

( * ) Notice: Subject to any disclaimer, the term of this patent is extended or adjusted under 35 U.S.C. 154(b) by 123 days.

(21) Appl. No.: 09/865,315

(22) Filed: May 25, 2001

(51) Int. Cl.[7] .................................................. B60Q 1/44
(52) U.S. Cl. ..................................... 340/479; 200/61.89
(58) Field of Search ................................. 340/479, 459, 340/463, 435, 436; 200/61.89, 86.5, 508, 250

(56) References Cited

U.S. PATENT DOCUMENTS

| | | | |
|---|---|---|---|
| 3,576,527 A | 4/1971 | Howard | |
| 4,346,365 A | 8/1982 | Ingram | |
| 4,404,439 A | * 9/1983 | Leighton | .................. 200/61.89 |
| 4,556,862 A | 12/1985 | Meinershagen | |
| 4,916,431 A | * 4/1990 | Gearey | .................... 200/61.89 |
| 5,097,251 A | 3/1992 | Ketcham | |
| D336,530 S | 6/1993 | Choi et al. | |
| 5,237,891 A | * 8/1993 | Lundberg et al. | .............. 74/560 |
| 5,311,412 A | 5/1994 | Yang | |
| 5,345,218 A | 9/1994 | Woods et al. | |
| 5,434,758 A | * 7/1995 | Zeidler | ........................ 340/472 |
| 5,838,228 A | * 11/1998 | Clark | ........................... 340/435 |
| 6,150,933 A | * 11/2000 | Matsumoto | ................. 340/467 |
| H002001 H | * 11/2001 | Pinkus | ......................... 340/463 |
| 6,486,774 B1 | * 11/2002 | Arnold, Sr. | .................. 340/467 |

* cited by examiner

Primary Examiner—John Tweel

(57) ABSTRACT

A motor vehicle brake light system for indicating when a person's vehicle has zero velocity. The motor vehicle brake light system includes a pressure sensitive pad mounted to a vehicle behind a brake pedal such that the brake pedal engages the pad when the brake pedal is depressed and a circuit is closed. A microprocessor is operationally coupled to the pad. A plurality of brake lights is mounted on the motor vehicle and operationally coupled to the microprocessor. The brake lights are steadily illuminated when the circuit is closed. A plurality of auxiliary lights is mounted on the motor vehicle and operationally coupled to the microprocessor. The auxiliary lights flash when the circuit is closed.

6 Claims, 3 Drawing Sheets

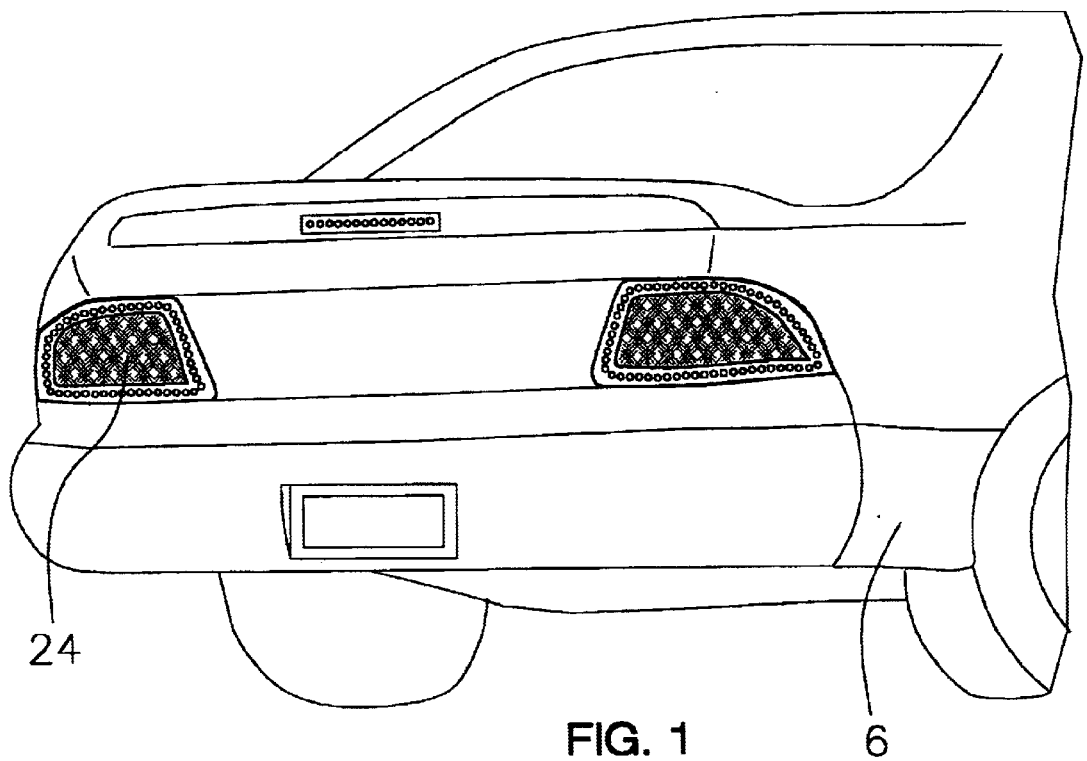
FIG. 1
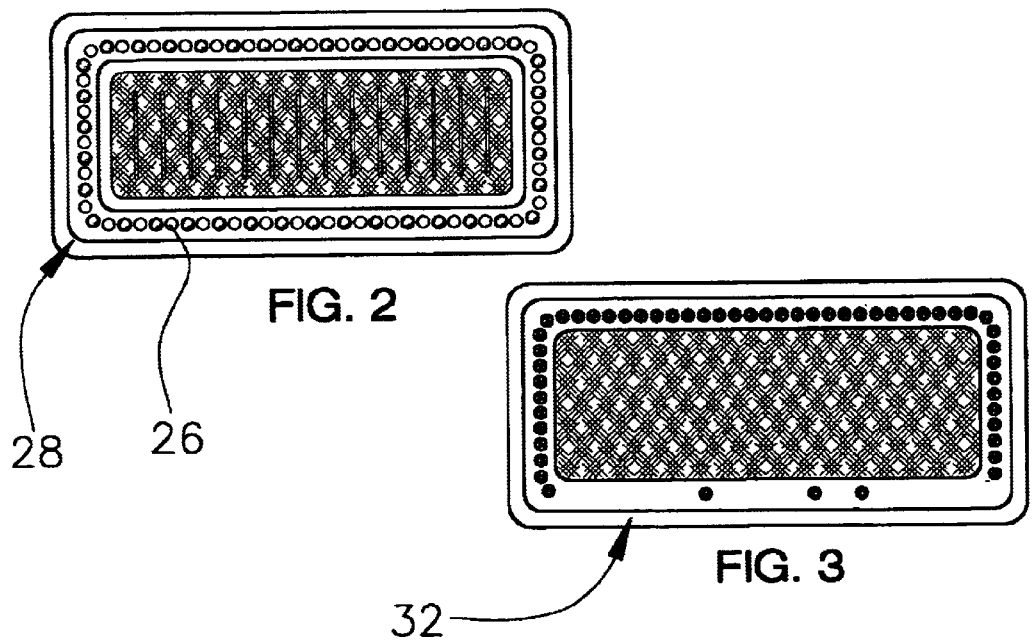
FIG. 2
FIG. 3

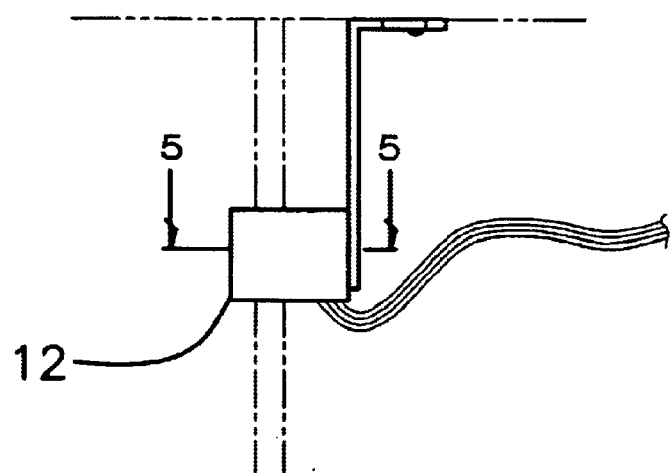
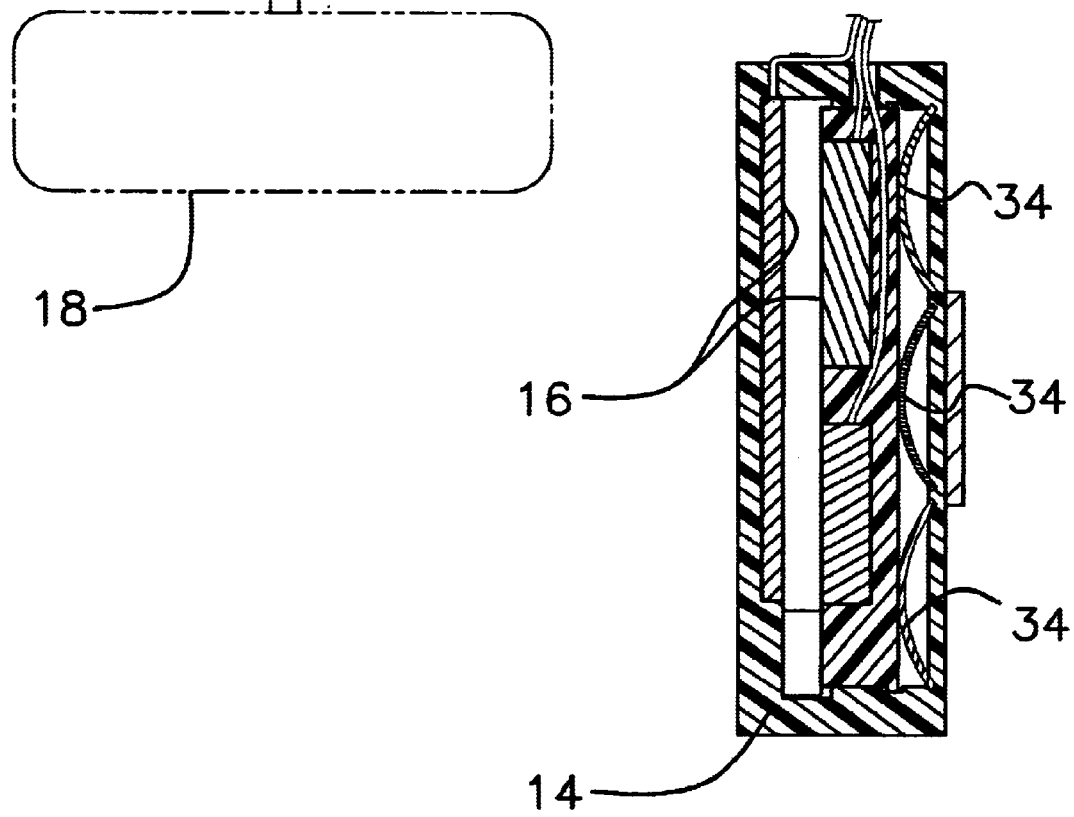

MOTOR VEHICLE BRAKE LIGHT SYSTEM

BACKGROUND OF THE INVENTION

1. Field of the Invention

The present invention relates to brake light devices for motor vehicles and more particularly pertains to a new motor vehicle brake light system for indicating when a person's vehicle has zero velocity.

2. Description of the Prior Art

The use of brake light devices for motor vehicles is known in the prior art. More specifically, brake light devices for motor vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,346,365; 3,576,527; 5,345,218; 5,311,412; 4,556,862; 5,097,251; and Des. No. 336,530.

While these devices fulfill their respective, particular objectives and requirements, the aforementioned patents do not disclose a new motor vehicle brake light system. The inventive device includes a pressure sensitive pad mounted to a vehicle behind a brake pedal such that the brake pedal engages the pad when the brake pedal is depressed and a circuit is closed. A microprocessor is operationally coupled to the pad. A plurality of brake lights is mounted on the motor vehicle and operationally coupled to the microprocessor. The brake lights are steadily illuminated when the circuit is closed. A plurality of auxiliary lights is mounted on the motor vehicle and operationally coupled to the microprocessor. The auxiliary lights flash when the circuit is closed.

In these respects, the motor vehicle brake light system according to the present invention substantially departs from the conventional concepts and designs of the prior art, and in so doing provides an apparatus primarily developed for the purpose of indicating when a person's vehicle has zero velocity.

SUMMARY OF THE INVENTION

In view of the foregoing disadvantages inherent in the known types of brake light devices for motor vehicles now present in the prior art, the present invention provides a new motor vehicle brake light system construction wherein the same can be utilized for indicating when a person's vehicle has zero velocity.

The general purpose of the present invention, which will be described subsequently in greater detail, is to provide a new motor vehicle brake light system apparatus and method which has many of the advantages of the brake light devices for motor vehicles mentioned heretofore and many novel features that result in a new motor vehicle brake light system which is not anticipated, rendered obvious, suggested, or even implied by any of the prior art brake light devices for motor vehicles, either alone or in any combination thereof.

To attain this, the present invention generally comprises a pressure sensitive pad mounted to a vehicle behind a brake pedal such that the brake pedal engages the pad when the brake pedal is depressed and a circuit is closed. A microprocessor is operationally coupled to the pad. A plurality of brake lights is mounted on the motor vehicle and operationally coupled to the microprocessor. The brake lights are steadily illuminated when the circuit is closed. A plurality of auxiliary lights is mounted on the motor vehicle and operationally coupled to the microprocessor. The auxiliary lights flash when the circuit is closed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motor vehicle brake light system apparatus and method which has many of the advantages of the brake light devices for motor vehicles mentioned heretofore and many novel features that result in a new motor vehicle brake light system which is not anticipated, rendered obvious, suggested, or even implied by any of the prior art brake light devices for motor vehicles, either alone or in any combination thereof.

It is another object of the present invention to provide a new motor vehicle brake light system which may be easily and efficiently manufactured and marketed.

It is a further object of the present invention to provide a new motor vehicle brake light system which is of a durable and reliable construction.

An even further object of the present invention is to provide a new motor vehicle brake light system which is susceptible of a low cost of manufacture with regard to both materials and labor, and which accordingly is then susceptible of low prices of sale to the consuming public, thereby making such motor vehicle brake light system economically available to the buying public.

Still yet another object of the present invention is to provide a new motor vehicle brake light system which provides in the apparatuses and methods of the prior art some of the advantages thereof, while simultaneously overcoming some of the disadvantages normally associated therewith.

Still another object of the present invention is to provide a new motor vehicle brake light system for indicating when a person's vehicle has zero velocity.

Yet another object of the present invention is to provide a new motor vehicle brake light system which includes a pressure sensitive pad mounted to a vehicle behind a brake pedal such that the brake pedal engages the pad when the brake pedal is depressed and a circuit is closed. A microprocessor is operationally coupled to the pad. A plurality of brake lights is mounted on the motor vehicle and operationally coupled to the microprocessor. The brake lights are steadily illuminated when the circuit is closed. A plurality of auxiliary lights is mounted on the motor vehicle and operationally coupled to the microprocessor. The auxiliary lights flash when the circuit is closed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of the brake lights and auxiliary lights of a new motor vehicle brake light system according to the present invention.

FIG. 2 is a schematic front view of the brake lights and auxiliary lights of the present invention.

FIG. 3 is a schematic front view of the brake lights and auxiliary lights of the present invention.

FIG. 4 is a schematic back view of the pad of the present invention.

FIG. 5 is a schematic cross-sectional view taken along line 5—5 of FIG. 4 of the present invention.

DESCRIPTION OF THE PREFERRED EMBODIMENT

Figure 6:
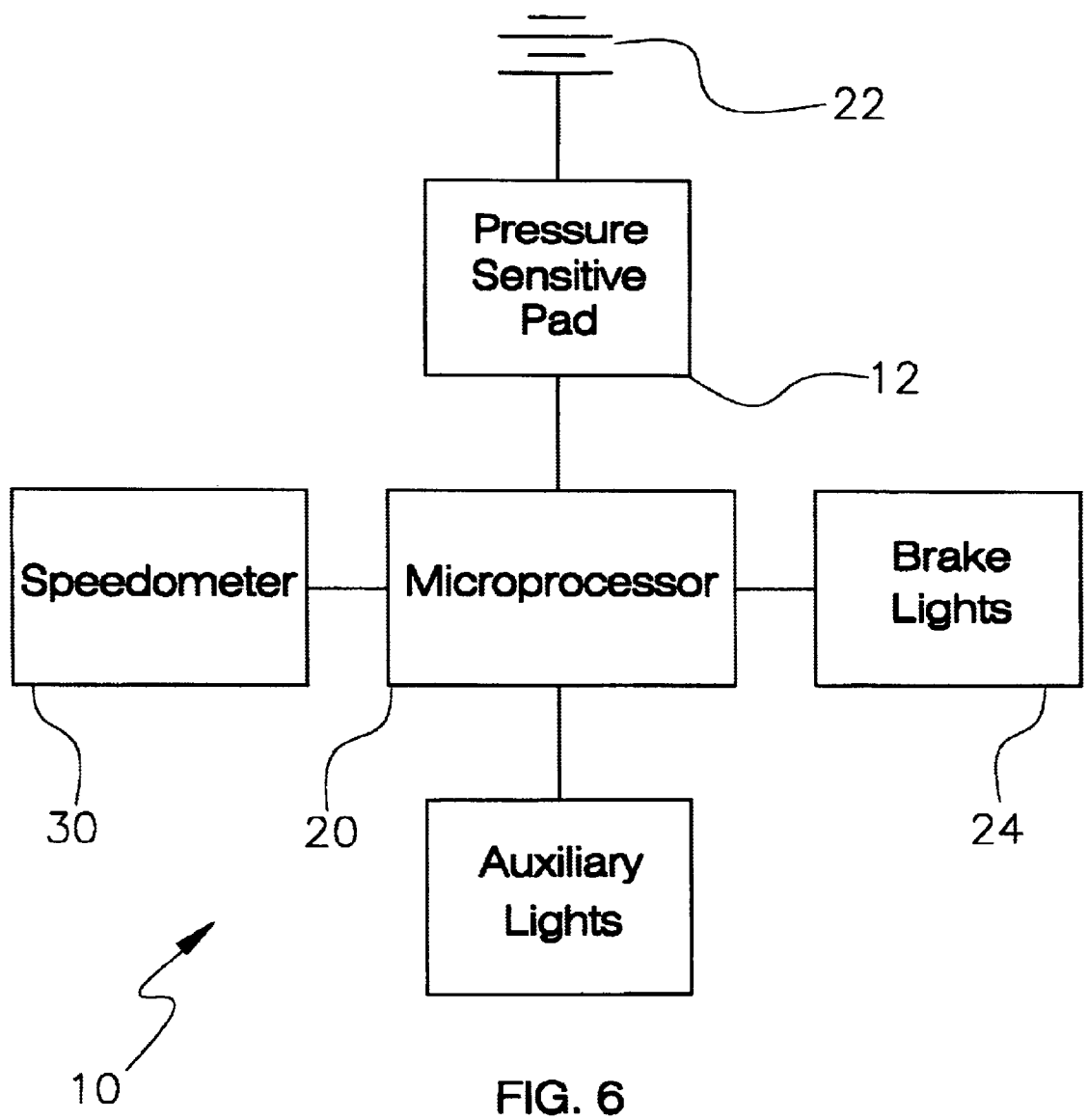
FIG. 6 is an electronic schematic view of the present invention.

With reference now to the drawings, and in particular to FIGS. 1 through 6 thereof, a new motor vehicle brake light system embodying the principles and concepts of the present invention and generally designated by the reference numeral 10 will be described.

As best illustrated in FIGS. 1 through 6, the motor vehicle brake light system 10 generally comprises a pressure sensitive pad 12 comprises a housing 14 having a pair of oppositely positioned contacts 16 facing each other. The housing 14 comprises an elastomeric material. A circuit is closed when the contacts 16 abut each other. The pad 12 is mounted to a vehicle 6 behind a brake pedal 18 such that the brake pedal 18 engages the pad 12 when the brake pedal 18 is depressed and the circuit is closed. The pressure sensitive pad 12 comprises at least one biasing member 34 positioned between a rear wall of the pressure sensitive pad 12 and one of the contacts 16 whereby the biasing member 34 biases the associated one of the contacts 16 against the other one of the contacts 16 when the pressure sensitive pad 12 is engaged by the brake pedal 18. A microprocessor 20 is operationally coupled to the pad 12. A power supply 22, preferably the battery of the motor vehicle 6, is operationally coupled to the microprocessor 20.

A plurality of brake lights 24 is mounted on the motor vehicle 6. The brake lights 24 are operationally coupled to the microprocessor 20. The brake lights 24 are steadily illuminated when the circuit is closed, and are generally conventional brake lights.

A plurality of auxiliary lights 26 is mounted on the motor vehicle. The auxiliary lights 26 extend around each of the brake lights 24. The auxiliary lights 26 are operationally coupled to the microprocessor 20. The auxiliary lights 26 flash 28 when the circuit is closed.

A speedometer 30 is operationally coupled to the vehicle 6 for indicating a velocity of the motor vehicle. The speedometer 30 is operationally coupled to the microprocessor 20. The auxiliary lights 26 are illuminated steadily 32 when the speedometer 30 indicates a velocity of zero miles per hour.

In use, the device 10 indicates the difference between a car slowing and a car which is stopped. When the brakes are being applied, the auxiliary lights flash 26. When the vehicle 6 is no longer moving, the auxiliary lights 26 are steadily illuminated. This allows a person following a user of the system verification of whether or not the user is completely stopped. Alternatively, the auxiliary lights 26 may continuously flash whether or not the circuit is closed and only be illuminated steadily when the vehicle has come to a stop.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brake lighting system for a motor vehicle comprising:
   a pressure sensitive pad being mounted to a vehicle behind a brake pedal such that said brake pedal engages said pad when said brake pedal is depressed and a circuit is closed;
   a microprocessor being operationally coupled to said pad;
   a power supply being operationally coupled to said microprocessor;
   a plurality of brake lights being mounted on said motor vehicle, said brake lights being operationally coupled to said microprocessor, wherein said brake lights are steadily illuminated when said circuit is closed;
   a plurality of auxiliary lights being mounted on said motor vehicle, said auxiliary lights being operationally coupled to said microprocessor, said auxiliary lights flashing when said circuit is closed; and wherein said pressure sensitive pad comprises a housing having a pair of oppositely positioned contacts facing each other, said housing comprising an elastomeric material, wherein a circuit is closed when said contacts abut each other, said pressure sensitive pad comprising at least one biasing member positioned between a rear wall of said pressure sensitive pad and one of said contacts such that said biasing member biases the associated one of the contacts against the other one of said contacts when said pressure sensitive pad is engaged by said brake pedal.

2. The brake lighting system for a motor vehicle as in claim 1, wherein said auxiliary lights extend around each of said brake lights.

3. The brake lighting system for a motor vehicle as in claim 1, further including a speedometer being operationally coupled to said vehicle for indicating a velocity of the motor vehicle, said speedometer being operationally coupled to said microprocessor, wherein said auxiliary lights are illuminated steadily when said speedometer indicates a velocity of zero miles per hour.

4. The brake lighting system for a motor vehicle as in claim 3, wherein said auxiliary lights extend around each of said brake lights.

5. A brake lighting system for a motor vehicle comprising:

a pressure sensitive pad comprising a housing having a pair of oppositely positioned contacts facing each other, said housing comprising an elastomeric material, wherein a circuit is closed when said contacts abut each other, said pad being mounted to a vehicle behind a brake pedal such that said brake pedal engages said pad when said brake pedal is depressed and said circuit is closed, said pressure sensitive pad comprising at least one biasing member positioned between a rear wall of said pressure sensitive pad and one of said contacts such that said biasing member biases the associated one of the contacts against the other one of said contacts when said pressure sensitive pad is engaged by said brake pedal;

a microprocessor being operationally coupled to said pad;

a power supply being operationally coupled to said microprocessor;

a plurality of brake lights being mounted on said motor vehicle, said brake lights being operationally coupled to said microprocessor, wherein said brake lights are steadily illuminated when said circuit is closed;

a plurality of auxiliary lights being mounted on said motor vehicle, said auxiliary lights extending around each of said brake lights, said auxiliary lights being operationally coupled to said microprocessor, said auxiliary lights flashing when said circuit is closed;

a speedometer being operationally coupled to said vehicle for indicating a velocity of the motor vehicle, said speedometer being operationally coupled to said microprocessor, wherein said auxiliary lights are illuminated steadily when said speedometer indicates a velocity of zero miles per hour.

6. An auxiliary brake apparatus for positioning around brake lights on a motor vehicle, the motor vehicle having a speedometer and a brake pedal, said device comprising:

a pressure sensitive pad comprising a housing having a pair of oppositely positioned contacts facing each other, said housing comprising an elastomeric material, wherein a circuit is closed when said contacts abut each other, said pad being mounted to a vehicle behind a brake pedal such that said brake pedal engages said pad when said brake pedal is depressed and said circuit is closed, said pressure sensitive pad comprising at least one biasing member positioned between a rear wall of said pressure sensitive pad and one of said contacts such that said biasing member biases the associated one of the contacts against the other one of said contacts when said pressure sensitive pad is engaged by said brake pedal;

a microprocessor being operationally coupled to said pad;

a power supply being operationally coupled to said microprocessor;

a plurality of auxiliary lights being mounted on said motor vehicle, said auxiliary lights extending around each of said brake lights, said auxiliary lights being operationally coupled to said microprocessor, said auxiliary lights flashing when said circuit is closed; and said speedometer being operationally coupled to said microprocessor, wherein said auxiliary lights are illuminated steadily when said speedometer indicates a velocity of zero miles per hour.

* * * * *